(12) United States Patent
Jones et al.

(10) Patent No.: US 6,682,810 B1
(45) Date of Patent: Jan. 27, 2004

(54) FLUORESCENT MATERIALS

(75) Inventors: Anita Claire Jones, West Linton (GB); James Stephen Barton, Gorebridge Midlothian (GB); Jolyon Mark De Freitas, Newbridge (GB); Julian David Clayton Jones, West Linton (GB); Philip Norman Spencer, Newbridge (GB); Guy John Gregory, Livingston (GB)

(73) Assignee: Heriot-Watt University, Edinburgh (GB)

( * ) Notice: Subject to any disclaimer, the term of this patent is extended or adjusted under 35 U.S.C. 154(b) by 0 days.

(21) Appl. No.: 09/526,360

(22) Filed: Mar. 16, 2000

(30) Foreign Application Priority Data

Mar. 16, 1999 (GB) .............................................. 9906011

(51) Int. Cl.$^7$ ................................................. B32B 5/16
(52) U.S. Cl. .................... 428/323; 428/332; 106/31.01; 106/31.05; 106/272; 252/301.16
(58) Field of Search ................................ 428/332, 323; 252/301.16, 301.34, 301.35; 106/272, 31.01, 31.02, 31.04, 31.06, 31.15

(56) References Cited

U.S. PATENT DOCUMENTS

| | | | |
|---|---|---|---|
| 3,118,060 A | 1/1964 | Klein | 250/71 |
| 3,930,063 A | 12/1975 | Miller et al. | 427/54 |
| 3,956,630 A | 5/1976 | Mellows | 250/302 |
| 4,250,382 A | 2/1981 | Libby | 250/302 |
| 4,597,093 A | 6/1986 | Fischer | 378/50 |
| 4,841,156 A | 6/1989 | May et al. | 250/461.1 |
| 4,922,113 A | 5/1990 | Melancon | 250/372 |
| 4,956,558 A | 9/1990 | Batishko et al. | 250/461.1 |
| 5,298,363 A | * 3/1994 | Weiss | 430/296 |
| 5,310,604 A | 5/1994 | Melancon et al. | 428/447 |
| 5,717,217 A | 2/1998 | Neckers et al. | 250/459.1 |
| 5,904,878 A | * 5/1999 | Merchak et al. | 252/301.16 |

FOREIGN PATENT DOCUMENTS

| | | |
|---|---|---|
| EP | 0336029 B1 | 11/1989 |
| EP | 0 997 503 A1 | 5/2000 |
| WO | WO 89/10268 | 11/1989 |
| WO | WO 97/14744 | 4/1997 |
| WO | WO 00/04340 | 1/2000 |

OTHER PUBLICATIONS

"Measuring Coating Thickness On Belt Transport", Anonymous, IBM Technical Disclosure Bulletin, vol. 22, No. 4, 1979, (no month).

* cited by examiner

Primary Examiner—Paul Thibodeau
Assistant Examiner—Christopher Paulraj
(74) Attorney, Agent, or Firm—Perman & Green, LLP

(57) ABSTRACT

According to one aspect of the present invention there is provided a coating material comprising: a functional coating component; and a fluorescent additive component whose fluorescence is substantially unquenched by the coating component, the fluorescent additive component having a peak fluorescence emission under excitation by visible or infrared light, the wavelength of that peak fluorescence emission being greater than 500 nm and lying outside the principal fluorescence absorption and emission wavelengths of the coating component.

17 Claims, 2 Drawing Sheets

FLUORESCENT MATERIALS

BACKGROUND OF THE INVENTION

This invention relates to fluorescent materials, in particular fluorescent materials suitable for permitting measurement of the thickness of a layer of or comprising such materials, and methods for measuring such a thickness.

There are numerous techniques available for measurement of the thickness of a layer of material. Examples include microscopy, measurement under physical contact (e.g. by using a micrometer), beta particle backscatter measurement, photothermal radiometry, optical interferometry and X-ray fluorescence measurement. However, these methods suffer from a number of disadvantages. In many situations it is not practical to make contact with the layer of material to be measured—for example because it is moving quickly or because it might be damaged on contact. Non-contact methods of measurement generally rely on the layer of material having tightly defined physical properties that are susceptible to the measurement method, and such methods cannot be used to measure other materials. Some methods, such as X-ray fluorescence measurement, have safety risks in most situations.

One particularly demanding situation is the measurement of the thickness of a layer of material in the manufacture of sheet or web products, especially if the thickness is to be measured during production, for example to allow the production process to be controlled to maintain a desired thickness. In this situation off-line analysis (e.g. by microscopy) of samples taken from the manufacturing process is problematic because it may be difficult to take samples from the moving sheet or web; the taking of samples may damage the sheet or web; and there may be an unacceptable time lag in the off-line measurement process that prevents the measurements being used to control the production process in real time. Measurement methods that require contact with the moving sheet or web can interfere with the production process and damage the product. Non-contact methods such as beta particle backscatter measurement, photothermal radiometry, optical interferometry and X-ray fluorescence measurement suffer from problems such as: (a) the measurement apparatus being relatively expensive; (b) insensitivity at very small thicknesses; and (c) they can only be used for a limited range of coating materials. Another approach is to attempt to measure thickness by inspecting the sheet as it is travelling during the production process. However, it may be difficult to view the sheet if the sheet is travelling quickly, especially if precise measurement is needed; and as it moves the sheet may vibrate across the direction of travel.

One specific example of a situation where these problems are felt is in the production of thermal transfer foil sheets. FIG. 1 shows a cross section of a sheet of thermal transfer foil sheet. The sheet comprises a backing layer 1 of polyester film. On the backing layer is deposited a thin release layer 2 of a wax material. The thickness of the release layer is approximately 10 nm, although at that scale there is normally significant irregularity in the thickness of the layer. On the release layer is an optional dyed lacquer layer 3 for colouring and a metallised layer 4 of, for example, vacuum deposited aluminium. Finally, over the metallised layer is a thermal adhesive layer 5.

In use, the adhesive layer 5 of the film is pressed against a substrate such as a sheet of paper by a shaped hot die. This activates the thermal adhesive layer in the areas where the die presses it against the substrate, causing the sheet to adhere to the substrate in those areas. Then the die is released and the film is stripped from the substrate. The bond between the thermal adhesive layer 5 and the substrate is greater than that between the release layer 2 and the dyed layer 3. Therefore, in the areas where the adhesive has stuck to the substrate the sheet parts at the release layer 2, leaving the dyed layer and the metallised layer fixed to the substrate in those areas.

The successful operation of the hot transfer foil is sensitively dependant on the thickness of the thin release layer 3. If the release layer is too thick then the appearance of the finished foil layer after deposition can be poor. If the release layer is too thin then when the sheet is stripped from the substrate the metallised layer 3 will not part properly from the backing layer 1, and the foil will not be deposited properly on to the substrate.

Thermal transfer foil is normally produced in a continuous web process, in which the web can run at a high speed. This high speed, together with the fact that the release layer 3 is very thin, makes it extremely difficult to measure the thickness of the release layer as the film is being produced. Therefore, manufacturers have relied on the experience of machine operators to control deposition of the release layer.

Numerous systems are known for measurement of film thickness by means of fluorescence intensity of the film.

U.S. Pat. No. 4,956,558 describes a system for determining the thickness of a fluorescent oil film on a bar rail. Blue-green laser light is focussed on to the end of an optical fibre which passes through the bar rail. Light leaving the end of the fibre illuminates the film and excites it to fluoresce. The fibre picks up a certain amount of the fluorescent light and carries it to a detector arrangement which provides a signal indicative of the thickness of the film.

U.S. Pat. No. 4,250,382 describes a system for measuring thickness of a silicone coating to which a fluorescent pigment has been added. It notes that fluorescent dyes (instead of pigments) were found to have unacceptable properties for coat weight determination.

U.S. Pat. No. 4,841,156 describes a system for measuring the thickness of a fluorescent coating on a film. The coating is illuminated with ultraviolet light, which excites the coating to fluoresce. The intensity of the fluorescent light is detected and used to determine the thickness of the coating. If the coating fluoresces at the same wavelengths as the film then an ultraviolet fluorescer can be added to the coating. The document notes that the amount of fluoresced light is linear with respect to the amount of coating present as long as the coating layer is quite thin. As the layer thickness increases the amount of light to thickness relationship becomes non-linear.

EP 0 336 029 A, WO 89/10268, U.S. Pat. No. 3,930,063, U.S. Pat. No. 3,956,630, U.S. Pat. No. 4,597,093, U.S. Pat. No. 4.922,113 and U.S. Pat. No. 5,717,217 disclose other arrangements for fluorescence measurement of films.

Prior art arrangements for the use of fluorescence to measure coating thickness concentrate on specific coating applications—i.e. individual coating compositions in specific circumstances where the thickness of the coating is approximately known. However, it would be useful for there to be a means whereby suppliers of coating compositions could arrange more generally for their coating compositions to be susceptible of thickness measurement by users who own suitable measurement equipment. Fluorescence intensity is generally related to film thickness by:

$$I_f = \Phi I_{ex}(1 - 10^{-\epsilon ct})$$

where $I_{ex}$ is the excitation beam intensity, $\Phi_f$ is the fluorescence quantum yield, $\epsilon$ is the molecular absorption coefficient, c is the molar concentration of the fluorescent component and t is the film thickness. For thin films and/or low concentrations of fluorescent component, when ($\epsilon$ct) is small, the relationship approximates to:

$$I_f = 2.303 \Phi_f I_{ex} \epsilon c t$$

Thus, under preferred conditions the measured fluorescence intensity is linearly proportional to film thickness. One desirable factor is that the fluorescence emission of the coating should remain a generally linear function of coating thickness over as wide a range as possible, to permit a user to measure over a wide range of thicknesses without inaccuracies due, for example, to interference from other components of the coating or from a substrate, and without a need to specially calibrate the measuring equipment to account for non-linear response. In providing a general means for various coating compositions to be measurable, the need is to provide for linearity over a wide range which is as much as possible independent of other material factors.

SUMMARY OF THE INVENTION

According to one aspect of the present invention there is provided a coating material comprising: a functional coating component; and a fluorescent additive component whose fluorescence is substantially unquenched by the coating component, the fluorescent additive component having a peak fluorescence emission under excitation by visible or infrared light, the wavelength of that peak fluorescence emission being greater than 500 nm and lying outside the principal fluorescence absorption and emission spectra of the coating component.

The inventors of the present invention have found that by selecting a fluorophore whose fluorescence is substantially unquenched by the coating component, and which has a peak fluorescence emission under excitation by visible or infrared light, the wavelength of that peak fluorescence emission lying outside the principal fluorescence absorption and emission spectra of the coating component, the likelihood of a coating composition as described above having a fluorescence response that is linearly related to its thickness over a substantial thickness range is greatly increased.

The wavelength of the said peak is suitably greater than 520 nm, preferably greater than 540 nm, and most preferably greater than 600 nm. The inventors of the present invention have found that with emission wavelengths greater than 500 nm and longer the likelihood of a coating composition as described above having a fluorescence response that is linearly related to its thickness over a substantial thickness range is greatly increased. The excitation wavelength corresponding to the said peak is suitably a wavelength at which the coating component is substantially non-absorbent—suitably by virtue of it lying outside the principal fluorescence absorption and emission spectra of the coating component. Thus, at the wavelength of the peak fluorescence emission the fluorescence emission intensity of the fluorescent component is suitably more than 1000, more than 5000 or more than 10000 times that of the coating material.

The coating component is suitably a material capable of forming a stable coating on a substrate, for example a wax (preferably a release wax) and/or a resin. The ratio of coating component to fluorescent component is suitably greater than 500:1 by weight, preferably more than 600:1 or 700:1 by weight.

The coating material may include other components, such as a solvent. The ratio of solvent to fluorescent component is suitably greater than 50000:1 by weight, preferably more than 60000:1 or 70000:1 by weight.

The fluorescent component is preferably a fluorescent dye. By avoiding the use of fluorescent pigments the fluorescent component may not interfere with a subsequent coating step even down to very low coating thicknesses. The fluorescent component is suitably a rhodamine such as rhodamine 101, particularly rhodamine 101 inner salt. Alternatively, the fluorescent component may preferably be an edible or food-grade dye such as circumin, riboflavin, new coccine or indigo carmine. The fluorescent component is suitably excitable to fluoresce at or near the wavelength of the said peak fluorescence by light in the wavelength range from 450 nm to 100 nm, preferably by light of a wavelength greater than 500 nm, and most preferably by light having a wavelength of 532 nm, which corresponds to the emission wavelength of a frequency doubled Nd:YAG laser. Typically, fluorescence emission occurs at very roughly a 50 nm longer wavelength than the initiating excitation. The fluorescence emission intensity of the fluorescent component is suitably more than 1000, more than 5000 or more than 10000 times that of the coating material when excited by light of such wavelengths. Excitation is preferably by a single wavelength but broader band excitation may be used.

The fluorescent component is suitably a dye, preferably a dye with a high fluorescence quantum yield, for example in excess of 0.5 (as, for instance, a laser dye). The fluorescent component material may be a material that is commonly used as a laser dye. The fluorescent material is suitably a salt. Preferably the peak fluorescence absorption of the fluorescent component is in the visible or infra-red range. The fluorescent component may be a mixture of two or more fluorescent materials. The percentage by weight of the fluorescent component is suitably less than 0.5%, preferably less than 0.3% and most preferably less than 0.2% of the dry weight of the coating component. The percentage by weight of the fluorescent component is suitably more than 0.05%, and preferably more than 0.1% of the dry weight of the coating component. The percentage by weight of the fluorescent component is suitably around 0.15% of the dry weight of the coating component.

According to a second aspect of the present invention there is provided a substrate coated with a coating of a coating material having any of the features as set out above. The fluorescence emission spectrum of the fluorescent component of the coating on the coated substrate suitably lies outside a fluorescence emission spectrum of the substrate. The substrate is suitably a polymer sheet preferably in the form of a web. There is suitably a metallic layer overlying the coating and an adhesive layer overlying the metallic layer. The substrate may comprise a fluorescent component. The peak fluorescence emission of that fluorescent component is preferably spaced spectrally from that of the fluorescent component in the coating. The coating is preferably substantially non-absorbent over the fluorescence emission peak of the fluorescent component of the substrate.

According to a third aspect of the present invention there is provided a method for forming a coated substrate and/or for measuring the thickness of a coating, comprising: mixing a coating component and a fluorescent component having any of the features as set out above; and coating the coating component on to a substrate. Preferably the method also includes the steps of: exciting the coating to fluoresce; detecting resultant fluorescence from the coating; and processing the detected fluorescence to determine the thickness of the coating. Preferably the method also includes the step of controlling the said coating step in dependence on the determined thickness, most preferably to maintain the thickness at a pre-set value. The method may also include the step of depositing a metallic layer and an adhesive layer over the coating.

BRIEF DESCRIPTION OF THE DRAWINGS

The present invention will now be described by way of example with reference to the accompanying drawings, in which.

DETAILED DESCRIPTION OF THE PREFERRED EMBODIMENT

The following example of the present invention is for the detection of coating thickness in the production of thermal transfer foil. It will be appreciated that this is just an example of the uses to which the present invention can be put.

Figure 1:
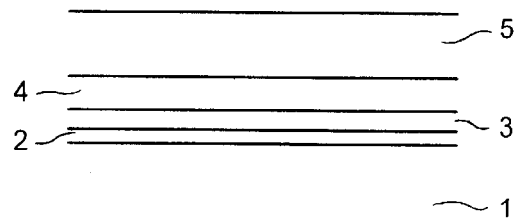
Figure 2:
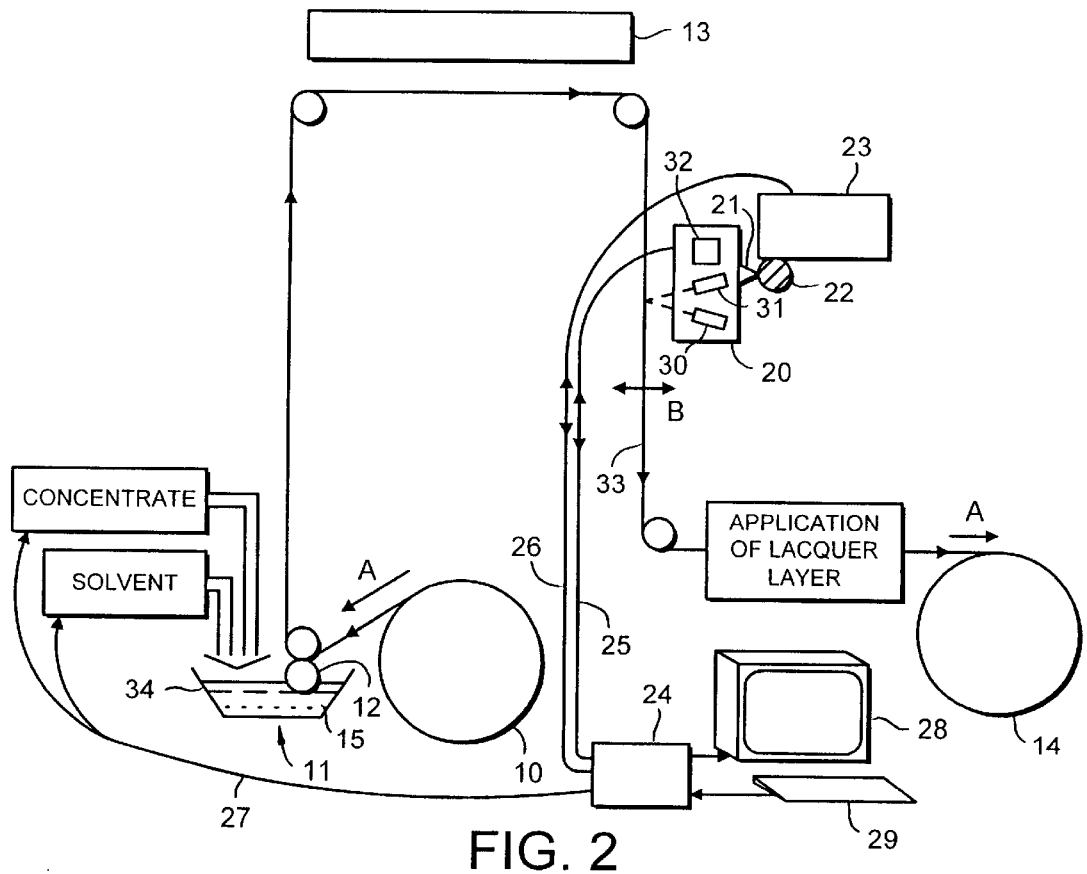
FIG. 2 shows a schematic diagram of part of a production line for thermal transfer foil.

FIG. 2 shows part of the apparatus for the manufacture of the thermal transfer foil of FIG. 1. A polyester sheet is fed from a reel 10 into a coating station 11. In the coating station a coating material that is principally a wax solution is applied to the moving sheet by a coating roller 12, and the sheet then moves past a dryer 13 that causes the solvent to evaporate and fixes the coating layer on the sheet. The sheet is then re-wound on a take-up reel 14 to be taken to the next step in the manufacturing process. A container 34 holds the wax solution 15 that is to be deposited by the coating roller. The thickness of the deposited release layer can be altered by adjusting feed of solvent or concentrate to container 34.

Apparatus for measurement of the thickness of the release layer is installed on the part of the production line shown in FIG. 2. The measurement apparatus comprises a measuring head shown generally at 20 that is mounted facing the deposited release layer and close to the sheet between the dryer 13 and the take-up reel 14. The measuring head 20 is mounted on a carriage 21 which rides on a support rail 22 set parallel to the sheet and across the direction of travel (see arrows A) of the sheet. The carriage can be driven along the rail by electric motor 23. A control unit 24 is set near the production line. The control unit can control the measuring head and receive measurement signals from the measuring head via a connection 25, can control the motor 23 via connection 26 in order to move the measurement head across the web, and can issue control signals to the coating station 11 to alter the thickness of the deposited coating layer via connection 27 to adjustment equipment for the solvent or concentrate feed. The system thus allows for closed-loop control of the coating thickness. A display 28 and a keyboard 29 are provided at the control unit to allow an operator to configure the control unit. A typical width of the web is 1.25 m.

Before the release layer is deposited a fluorescent component (rhodamine 101 inner salt) is added to the wax solution at a weight percentage of 0.15% of the dry weight of the wax. The measuring head 20 comprises a light source 30 (which could be a broadband source such as a white lamp or a narrow-band source such as a laser) that is capable of exciting the fluorescent component and a light detector 31 (e.g. a spectrometer) that is capable of detecting the resulting fluorescence of the fluorescent component. Instead of being mounted in the head 20, the light source 30 and light detector 31 could be mounted remotely. Light from the light source may be directed to the measurement site by an optical fibre, and optical fibre may be used to direct the fluorescent light to a detector. After local processing by an interface unit 32 the signal from the detector 31 is fed to the control unit 24 via connection 25. The greater the thickness of the release layer, the greater is the intensity of the resulting fluorescence. Therefore, the control unit is capable of measuring the thickness of the release layer and controlling it as the process runs by adjusting the feed to container 34.

Figure 3:
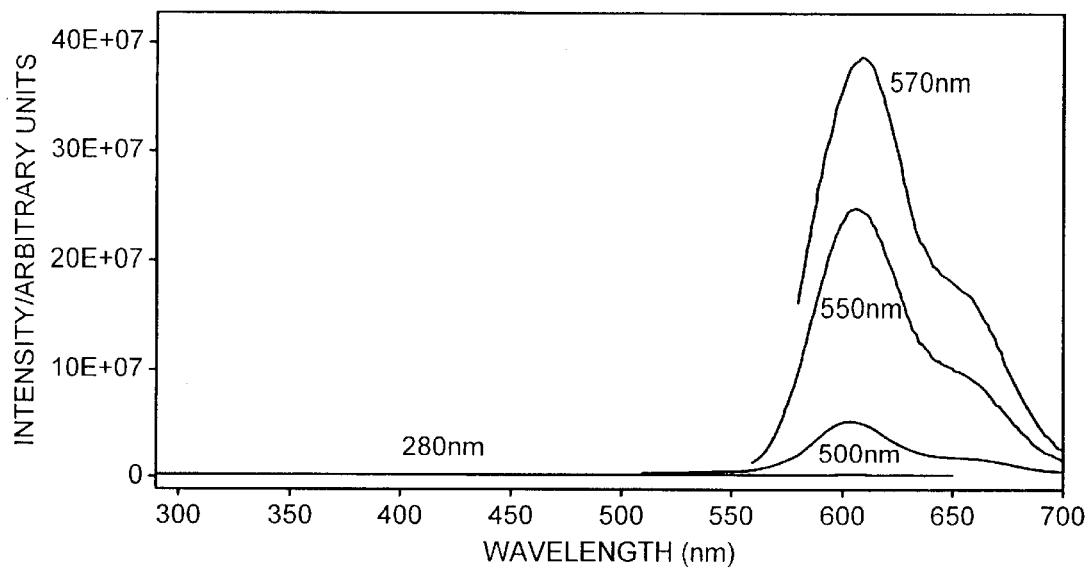
FIG. 3 shows the fluorescence emission spectra of rhodamine 101 inner salt for a range of excitation frequencies.
Figure 4:
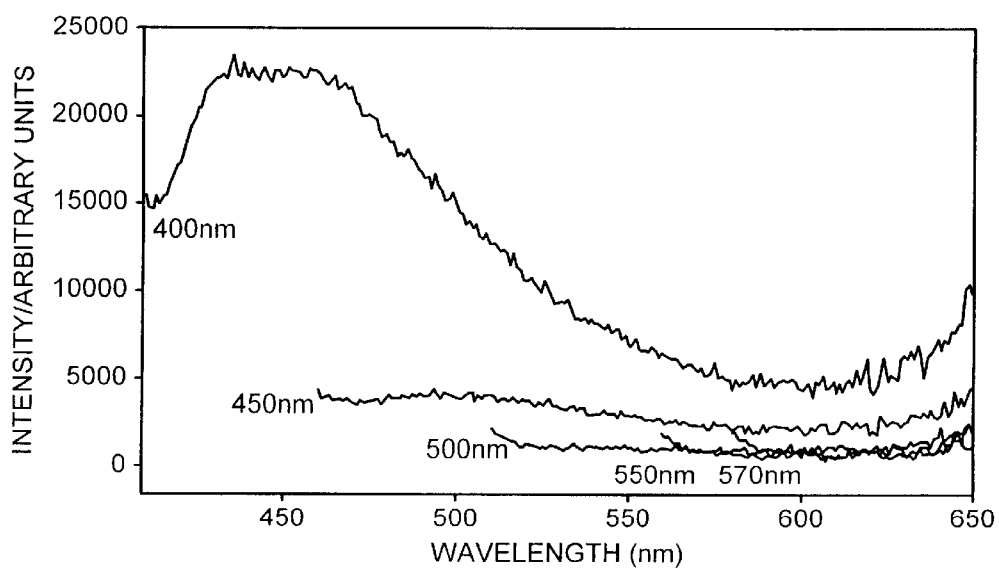
FIG. 4 shows the fluorescence emission spectra of a release wax coating in solution for a range of excitation frequencies.

The excitation wavelength for the release coating application illustrated in FIG. 2 is 532 nm, which is obtained from a frequency doubled diode-pumped solid state Nd-YAG laser such as a 10 mW Nd-YAG laser supplied by Laser 2000. The selected fluoro phore is rhodamine 101 inner salt. FIG. 3 shows the fluorescence emission spectra of rhodamine 101 inner salt for a range of excitation wavelengths around 532 nm. The peak in emission intensity is at an emission wavelength of around 610 nm. FIG. 4 shows the fluorescence emission spectra of the release wax coating in solution for a range of excitation wavelengths around 532 nm. The emission intensity is substantially minimised at an excitation wavelength of 532 nm and is substantially at a minimum around 610 nm. Therefore, the fluorescence activity of the fluorophore can easily be distinguished from that of the remainder of the coating.

It has been found to be greatly preferable that the fluorophore is excitable by light in the visible (400 nm to 750 nm) range and/or in the infra-red (750 nm to 750 $\mu$m) range, since a wide range of lamps and more preferably lasers are available to excite fluorophores at such longer wavelengths, and light of those wavelengths regions can easily be guided in the detection and excitation equipment by optical fibres. In contrast, relatively few arrangements are available for selective excitation of fluorophores in the ultraviolet, and special optics are required to direct and focus ultra-violet light.

Rhodamine 101 has a fluorescence excitation peak at 568 nm and a corresponding emission peak at 608 nm. The use of such long wavelength fluorescence—and generally of fluorescence emission at greater than 500 nm—provides for a good likelihood of great selectivity and therefore accurate thickness measurement over a large range.

In the system described above, although the coating wax has fluorescence properties itself, the use of an additional rhodamine 101 fluorophore yields excellent results. Using a coating composition comprising a solvent and 0.9% w/w of wax and 0.15% w/w of rhodamine fluorophore, a linear relationship between coating thickness and fluorescence emission intensity at the emission wavelength of the fluorophore can be measured over a range of coating thicknesses from around 0.3 nm or less to around 800 $\mu$m or more. By adjusting the doping concentration of the fluorophore it would be expected that other thickness ranges could be measured accurately over a similar range of magnitude.

By adding a suitable fluorophore to the material that is to form a coating or other layer the technique described above may be employed for thickness measurement in other fields. The technique described above therefore has wide applicability. Very many materials exhibit fluorescence at ultraviolet frequencies, because of the presence in them of high energy excitable states. This includes many typical coating materials such as waxes and substrate materials such as polyester. It has been found that in order for the fluorescence of a coating composition to be used for coating thickness measurement over wide ranges of thickness it is extremely valuable to arrange for the fluorescent additive to be one whose fluorescent emission is at greater than 500 nm and preferably greater than 540 nm or even 600 nm. Such an additive may be excitable to fluoresce by light of 500 nm or greater. With the use of a fluorophore in this range linear measurement of coating thickness is possible over a wide range of thicknesses and on a range of substrate materials. As described above, by means of the present invention it is possible to realise a linear relationship between thickness and fluorescence intensity over a factor of 2000 to 4000 in thickness.

Additional considerations that may preferably be borne in mind in selecting a combination of coating material and fluorophore are as follows:
1. The fluorescence emission spectrum of the fluorophore should be sufficiently distinct from that of the remainder of the coating that fluorescence from the two can be distinguished spectrally.
2. The fluorescence emission spectrum of the fluorophore should be sufficiently distinct from the absorption spectrum of the remainder of the coating that fluorescence by the fluorophore is not significantly attenuated by the remainder of the coating. Otherwise, accurate determination of the thickness of the coating could be hindered by fluorescence from greater depths in the coating being blocked from reaching a detector.
3. The fluorescence excitation spectrum of the fluorophore should be sufficiently distinct from the absorption spectrum of the remainder of the coating that fluorescence can easily be excited throughout the thickness of the coating without hindrance from absorption of the exciting light by the remainder of the coating.
4. The presence of the fluorophore in the coating in sufficient quantities to permit accurate thickness measurement should not hamper the coating process. Selecting an fluorophore that is efficient when in the coating material may assist in meeting this criterion since it may be sufficiently active in relatively small quantities.
5. The fluorophore should be active (e.g. not quenched) when present iii the coating.
6. The fluorophore should be capable of being mixed with the coating material evenly throughout the coating.
7. The fluorophore should be economical to use in the required quantities.
8. The fluorophore should not pose any unacceptable health hazards. Indeed, for food-grade applications it may be appropriate for the fluorophore to be a food-grade or edible dye.

The emission spectra referred to in these criteria are the emission spectra of the materials under excitation by a selected excitation frequency or range of frequencies. A suitable excitation frequency may be obtainable from a laser or a light-emitting diode, preferably of a readily obtainable type. The listed criteria may be easily assessed using techniques including spectroscopy when a fluorophore is to be selected for a certain coating application.

It is greatly preferable that the fluorophore should be active above 500 nm, in the visible or in the infra-red region. Ultra-violet fluorophores call for a more complex and costly excitation and detection system, possibly pose a greater hazard in the industrial environment, and offer less selectivity over the fluorescence of other materials that may be expected to be present.

Fluorophores that may be considered for an application include dyes commonly used in laser devices. The following compounds are specific candidate fluorophores: Acid blue 161; Aluminium phthalocyanine chloride; Aluminium phthalocyanine hydroxide; Aluminium 1,8,15,22-tetrakis(phenylthio)-29H,31-H-phthalocyanine chloride; Aluminium 2,3,16,23-tetrakis(phenylthio)-29H,31-H-phthalocyanine chloride; Aluminium 1.8,15,22-tetraphenoxy-29H,31-H-phthalocyanine chloride; Aluminium 2,9,16,23-tetraphenoxy-29H,31-H-phthalocyanine chloride; Aluminium 2,9,16,23-tetraphenoxy-29H,31-H-phthalocyanine hydroxide; Aluminium 5,14,23,32-tetraphenyl-2,3-napthalocyanine hydroxide; Carmine; Carminic acid; Cresyl violet acetate; Cresyl violet perchlorate; Dilithium phthalocyanine ; Disodium phthalocyanine; Fluorescein; Fluorescein, sodium salt; Fluorescein diacetate; Fluorescein isothiocyanate, isomer I; Gallium phthalocyanine chloride; Gallium phthalocyanine hydroxide; Gallium(III) 2,3-naphthalocyanine chloride; IR125; IR 140; IR132; IR 780 iodide; IR 780 perchlorate; IR792 perchlorate; Magnesium phthalocyanine; 2,3-Naphthalocyanine; New coccine; Nile blue chloride; Nile blue A; Nile blue oxazone (=Nile red); Nile blue A perchlorate; Oxazine 1 perchlorate; Oxazine 170 perchlorate; 29H,31H-phthalocyanine; Pyrromethene 580; Rhodamines and Rhodamine salts, including Rhodamine B, Rhodamine B base; Rhodamine B isothiocyanate, Rhodamine 6G, Rhodamine 6G perchlorate, Rhodamine 101 inner salt, Rhodamine 123 hydrate, Rhodamine 700, Rhodamine 110 and Rhodamine 6G tetrafluoroborate; Silicon 2,3-naphthalocyanine bis(trihexylsilyloxide); Silicon 2,3-naphthalocyanine dichloride; Silicon 2,3-naphthalocyanine dihydroxide; Silicon 2,3-naphthalocyanine dioctyloxide; Silicon(IV) phthalocyanine bis(trihexylsilyloxide); Silicon 2,3-phthalocyanine dichloride; Silicon 2,3-phthalocyanine dihydroxide; Silicon 2,9,1 6,23-tetra-tert-butyl-29H,31H-phthalocyanine dichloride; Zinc 1,2,3,4,8,9,10,11,15,16,17,18,22.23,24,25-hexadecafluoro-29H,31H-phthalocyanine; Zinc 1,4,8,11,15,18,22,25-octabutoxy-29H,31H-phthalocyanine; Zinc phthalocyanine; Zinc 2,11,20,29-tetra-tert-butyl-2,3-naphthalocyanine; and Zinc 2,9,16,23-tetra-tert-butyl-29H,31H-phthalocyanine.

Relatively few fluorophores are adequately active over 500 nm. It is believed that this leads at least in part to the enhanced selectivity, measurement accuracy and wide applicability that can be achieved with the present invention. The structures of some of the visible fluorophores are as follows:

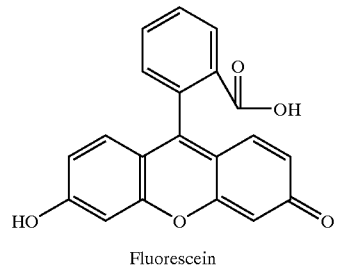

Fluorescein

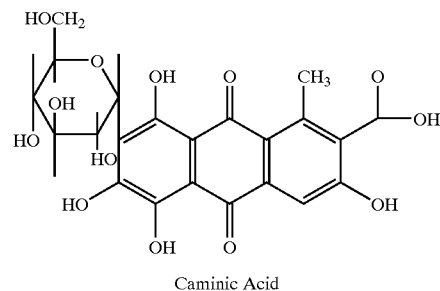

Caminic Acid

-continued

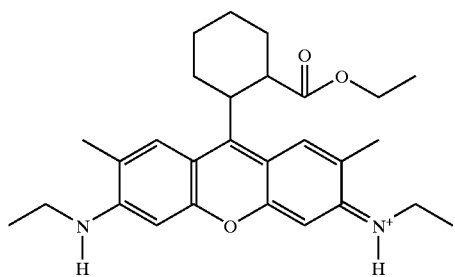

Rhodamine 6G Perchlorate

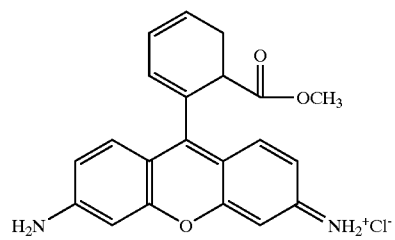

Rhodamine 123

(Counter ion is $BF_4^-$: tetrafluoroborate)

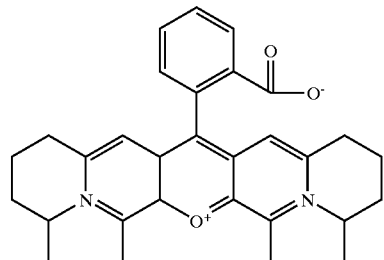

Rhodamine 101 inner salt

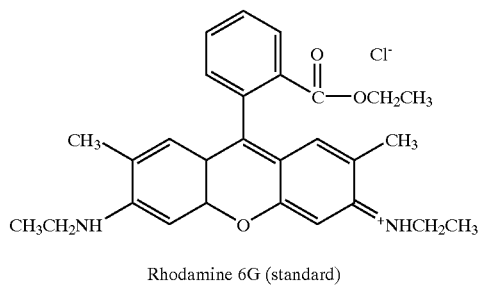

Rhodamine 6G (standard)

Selected IR fluorophore structures are shown below:

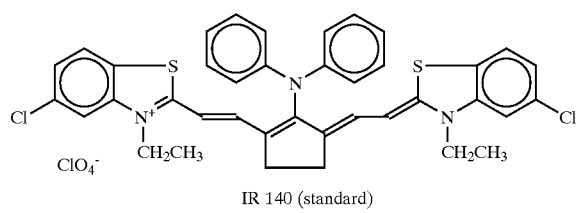

IR 140 (standard)

-continued

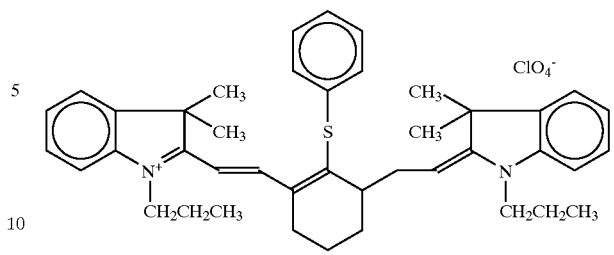

IR 792

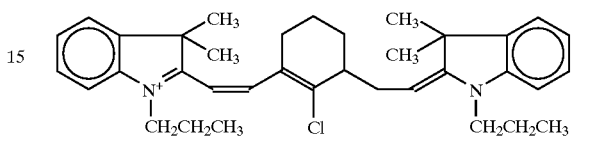

IR 780

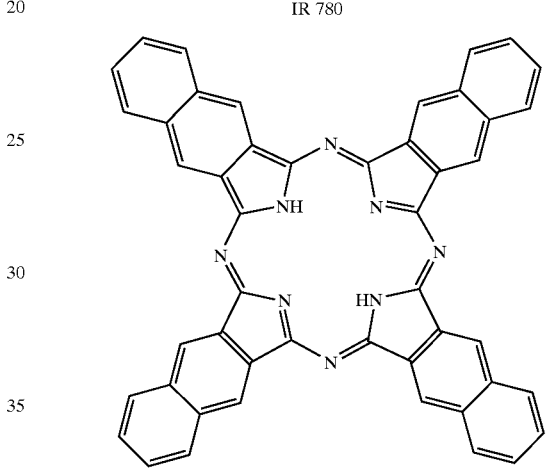

Naphthalocyanine

The properties of selected visible fluorophores are given in the following table:

| Compound | Excitation Peak (nm) | Emission Peak (nm) | Emission peak (nm) in the release coating of the system of FIG. 2 |
|---|---|---|---|
| Carminic acid 96% | 505 | 596 | 587 (620) |
| Fluorescein 95% | 495 | 555 | 561 |
| Rhodamine 101 inner salt | 568 | 592 | 608 |
| Rhodamine 123 | 520 | 540 | 542 |
| Rhodamine 6G perchlorate | 540 | 561 | 562 |
| IR 780 Iodide | 800 | 835 | 818 |
| IR 780 perchlorate | 800 | 835 | 837 |
| IR 792 | 800 | 847 | 848 |
| IR 140 | 840 | 855 | 855 |
| Rhodamine 6G | 540 | 555 | 557 |

In the system of FIG. 2, in which the release coating is heated after application to the web, consideration should also be paid to ensuring that the fluorophore and its properties are sufficiently stable under heating. Other process factors in other situations should be considered similarly.

Further details of the detection apparatus illustrated in FIG. 2 are given in our co-pending patent application filed on the same day as the present application and entitled "Measuring Apparatus" ( . . . patent application number . . . ), the contents of which are incorporated herein by reference.

The apparatus of FIG. 2 could be adapted for use in other situations, including situations outside the field of application of coatings during web manufacturing. By adding fluorophores to other materials, or by exploiting materials' natural fluorescence, similar measurements could be made of the thickness (or deposition density) of those materials instead of the wax release coating described above. The measurement could be conducted on moving sheet materials or stationary materials. Where the thickness of a coating is being measured, the coating could be deposited by any suitable method, including flexo and gravure printing. Preferably, but not necessarily, the coating is measured in its dry state—since the final thickness is then better known.

An advantage of the apparatus and coating compositions described above is that, with suitable detection and excitation equipment, they allow for measurement of thickness over a very wide range, for example across five or more orders of magnitude. This range could be extended further in a given process by simply reducing the concentration of the fluorophore in the material under study. Furthermore, the non-contact and rapid nature of the detection process makes it especially suitable for use in a continuous process and for thickness control via feedback.

In a multi-layer product different fluorophores could be included in different layers or coatings to allow the thicknesses of those layers to be detected independently after one has been deposited over the other. As additional criteria for selection of fluorophores for such a system it should be borne in mind that if the fluorophore of a layer is to be excited and detected through an overlying layer then the excitation of and emission from the fluorophore of the underlying layer should not be hindered by absorption from the overlying layer. This technique may also be used to normalise for differences in the sample to detector distance. For example, in the system of FIG. 2, a fluorophore could be added to the backing film 1, which has a constant thickness. The intensity detected from the fluorescence from the film could be compared with that from the release coating 2 to normalise the measurement of coating thickness. If the thickness of the backing film were not known then the technique could be used to estimate its thickness.

The present invention may include any feature or combination of features disclosed herein either implicitly or explicitly or any generalisation thereof irrespective of whether it relates to the presently claimed invention. In view of the foregoing description it will be evident to a person skilled in the art that various modifications may be made within the scope of the invention.

What is claimed is:

1. A coating material comprising:
   a functional coating component; and
   a fluorescent additive component whose fluorescence is substantially unquenched by the coating component, the fluorescent additive component having a peak fluorescence emission under excitation by visible or infrared light, the wavelength of that peak fluorescence emission being greater than 500 nm and lying outside the principal fluorescence absorption and emission wavelengths of the coating component, and wherein the excitation wavelength corresponding to the said peak lies outside the principal fluorescence absorption wavelength of the coating component.

2. A coating material as claimed in claim 1, wherein the wavelength of the said peak is greater than 520 nm.

3. A coating material as claimed in claim 1, wherein the wavelength of the said peak is greater than 540 nm.

4. A coating material as claimed in claim 1, wherein the wavelength of the said peak is greater than 600 nm.

5. A coating material as claimed in claim 1, wherein the coating component is a wax.

6. A coating material as claimed in claim 1, wherein the ratio of coating component to fluorescent component is greater than 500:1 by weight.

7. A coating material as claimed in claim 1, comprising a solvent.

8. A coating material as claimed in claim 7, wherein the ratio of solvent to fluorescent component is greater than 50000:1 by weight.

9. A coating material as claimed in claim 8, wherein the fluorescent component is a fluorescent dye.

10. A coating material as claimed in claim 8, wherein the fluorescent component is rhodamine 101 inner salt.

11. A coating material as claimed in claim 8, herein the fluorescent component is excitable to fluoresce at the wavelength of the said peak fluorescence by light in the wavelength range from 450 nm to 1100 nm.

12. A coating material as claimed in claim 8, wherein the fluorescent component is excitable to fluoresce at the wavelength of the said peak fluorescence by light having a wavelength of 532 nm.

13. A substrate coated with a coating of a coating material as claimed in claim 1.

14. A coated substrate as claimed in claim 13, wherein the wavelength of the said peak fluorescence emission lies outside the principal fluorescence absorption wavelengths of the substrate.

15. A coated substrate as claimed in claim 13, wherein the substrate is a polymer sheet.

16. A coated substrate as claimed in claim 13, comprising a metallic layer overlying the coating and an adhesive layer overlying the metallic layer.

17. A coated substrate as claimed in claim 13, wherein the thickness of the coating is in the range from 1 nm to 5mm.

* * * * *

UNITED STATES PATENT AND TRADEMARK OFFICE
CERTIFICATE OF CORRECTION

PATENT NO. : 6,682,810 B1
DATED : January 27, 2004
INVENTOR(S) : Jones et al.

It is certified that error appears in the above-identified patent and that said Letters Patent is hereby corrected as shown below:

Title page,
Item [73], Assignee, after "Heriot-Watt University, Edinburgh (GB)" add -- The University Court Of The University Of Edinburg, Edinburg (GB), API Foils Limited, West Lothian (GB) --.

Signed and Sealed this

Twenty-eighth Day of February, 2006

JON W. DUDAS
*Director of the United States Patent and Trademark Office*